United States Patent [19]
Niitsuma et al.

[11] Patent Number: 5,926,167
[45] Date of Patent: Jul. 20, 1999

[54] COORDINATE INPUT DEVICE

[75] Inventors: Hirobumi Niitsuma; Daisuke Shirai, both of Iwaki, Japan

[73] Assignee: Alps Electric Co., Ltd., Tokyo, Japan

[21] Appl. No.: 08/188,629

[22] Filed: Jan. 28, 1994

Related U.S. Application Data

[63] Continuation of application No. 07/914,271, Jul. 15, 1992, abandoned.

[30] Foreign Application Priority Data

| Jul. 22, 1991 | [JP] | Japan | 3-205384 |
| Jul. 31, 1991 | [JP] | Japan | 3-073056 U |

[51] Int. Cl.[6] ............................................. G09G 5/00
[52] U.S. Cl. ............................ 345/156; 345/164; 345/167
[58] Field of Search ..................................... 345/145, 156,
345/157, 163, 164, 167; 273/148 B; 74/471 XY;
463/37, 38; D14/117.2, 117.3, 117.5

[56] References Cited

U.S. PATENT DOCUMENTS

| 4,505,165 | 3/1985 | Wiezer | 384/245 |
| 4,630,485 | 12/1986 | Wastl | 73/861.56 |
| 4,951,034 | 8/1990 | Mazzone et al. | 340/710 |
| 4,952,919 | 8/1990 | Nippoldt | 340/706 |
| 5,171,978 | 12/1992 | Mimlitch | 340/710 |

FOREIGN PATENT DOCUMENTS

| 1102366 | 2/1968 | United Kingdom | 340/710 |

Primary Examiner—Lun-Yi Lao
Attorney, Agent, or Firm—Brinks, Hofer, Gilson and Lione

[57] ABSTRACT

A coordinate input device including a housing having an opening, a ball received in the housing so as to be rotatable in any direction, the ball partially projecting through the opening, a pair of rotating shafts arranged so as to define a predetermined angle therebetween in the housing and adapted to be rotated in association with rotation of the ball, a spring for biasing the rotating shafts against the ball, a rotation detector for detecting a quantity of rotation of each of the rotating shafts, and a printed board mounted on the housing, the rotation detector being mounted on the printed board, whereby a cursor position or the like on a screen is controlled according to the rotation of the ball in any direction. The housing is provided with at least three supporting members for supporting the ball, at least three retaining portions for respectively receiving the supporting members from a side of the housing where the printed board is to be mounted and for respectively retaining the supporting members in contact with the ball, a shaft supporting portion for supporting each of the rotating shafts mounted into the housing from the printed board mounting side of the housing in such a manner that the rotating shafts are displaceable toward and away from the ball, and a spring retainer portion for retaining the spring mounted into the housing from the printed board mounting side of the housing.

11 Claims, 7 Drawing Sheets

COORDINATE INPUT DEVICE

This application is a continuation of application Ser. No. 07/914,271, filed Jul. 15, 1992, now abandoned.

BACKGROUND OF THE INVENTION

The present invention relates to a coordinate input device, and more particularly to a coordinate input device for generating a coordinate data for control of a cursor position or the like on a screen by rotating a ball in any direction.

Conventionally, a coordinate input device is used to control a cursor position, a figure coordinate position, etc. on a screen of a display such as a CRT by rotating in any direction a ball partially projecting through an opening of a housing. In general, such a coordinate input device includes a housing having an opening, a ball received in the housing so as to be rotatable in any direction, the ball partially projecting through the opening, a pair of rotating shafts arranged orthogonally to each other in the housing and adapted to be rotated in association with rotation of the ball, a rotation detector for detecting a quantity of rotation of each of the rotating shafts, and a printed board mounted on the housing, the rotation detector being mounted on the printed board. In general, an annular retainer for retaining the ball in the housing is detachably mounted to the opening of the housing, and springs for biasing the rotating shafts against a surface of the ball is provided in the housing. There is a case that the surface of the ball is stained or damaged in the use of such a coordinate input device. In such a case, it is necessary to remove the retainer and take the ball out of the housing through the opening for the purpose of cleaning or replacement of the ball. Accordingly, the opening for allowing pass of the ball is normally formed on the side of the housing opposite to a surface for mounting the printed board. On the other hand, ball supporting members for supporting the ball, the rotating shafts, the spring, etc. normally need not be subjected to the maintenance such as cleaning and replacement, so that they are preferably not allowed to be mounted and demounted from the opening side of the housing.

Further, in recent years, there is a tendency that such a ball type coordinate input device is directly installed in a keyboard of a computer, particularly a small-sized computer such as a laptop personal computer, notebook-size personal computer, or handy personal computer, or is installed in a small-sized case of a pen type. Accordingly, the ball to be employed in the coordinate input device of this type tends to be increasingly reduced in diameter, and the supporting members for supporting the ball tend to also be increasingly reduced in size. As a result, a work of mounting the supporting members into the housing becomes difficult more and more.

In the prior art, the rotating shafts, a part of the ball supporting members for supporting the ball, etc. are mounted from the ball receiving side of the housing, that is, from the side opposite to the printed board mounting surface of the housing, so that there is a possibility that the rotating shafts, the ball supporting members, etc. unduly come out of the housing. Further, the printed board is mounted on the housing from one side of the housing, while a part of the ball supporting members, the rotating shafts, etc. must be mounted into the housing from the other side opposite to the printed board mounting surface. Accordingly, an assembly operation of the coordinate input device becomes troublesome to cause an increase in cost.

Meanwhile, there is a tendency that a spherical member is used as the ball supporting member in accordance with the tendency of downsizing of the ball supporting member. FIG. 12 is a plan view of an essential part of a mounting structure of such a spherical supporting member in a conventional coordinate input device. As shown in FIG. 12, a housing 1 is formed with a groove 3 for receiving a part of a spherical supporting member 2. The spherical supporting member 2 is fixed in the groove 3 by caulking the opposite sides of the groove 3 as depicted by reference numerals 4, or it is fixed in the groove 3 by adhesive.

However, in the case of the fixing method by caulking, the caulked portion is apt to be loosened by aged deterioration, causing a possibility that the supporting member 2 comes out of the groove 3. Further, an expensive caulking apparatus is required, and a caulking step is additionally required in the assembling of the coordinate input device, causing a reduction in assembly operability.

In contrast, in the case of the fixing method by adhesive, it is difficult to apply a suitable amount of adhesive to a suitable portion of the small spherical supporting member 2, and there is a possibility that the adhesive overflowed from the groove 3 comes into contact with the ball to damage the slidability of the ball. Further, an adequate time for drying and hardening the adhesive is required to cause a reduction in assembly operability of the coordinate input device.

In a conventional coordinate input device wherein the ball is rotatably supported at three points by two rotating shafts and a single supporting member, a depression force applied to the ball is applied to the rotating shafts. Therefore, when an excessive depression force is applied to the ball, the rotating shafts are apt to be deformed, so that they cannot follow the rotation of the ball to interfere with detection of the rotation. If a diameter of each rotating shaft is enlarged, so as to prevent the deformation of the rotating shafts, a compact construction of the coordinate input device as a whole becomes difficult to achieve.

Further, in a conventional coordinate input device wherein the ball is rotatably supported at three points by three fixed supporting members provided in the housing, the above-mentioned problem can be eliminated. However, each rotating shaft is biased against the ball by means of springs in the vicinity of opposite ends of the rotating shaft, so that possible variation in biasing force of the springs brings about the difficulty of retention of each rotating shaft in a fixed position. As a result, there occurs slippage in position of a rotating plate mounted on each rotating shaft relative to a rotation detector for detecting a quantity of rotation of the rotating plate, causing a reduction in detection accuracy of the rotation detector.

SUMMARY OF THE INVENTION

It is accordingly a first object of the present invention to provide a coordinate input device improved in assembly operability.

It is a second object of the present invention to provide a coordinate input device which can ensure mounting of the supporting members for supporting the ball without damaging the slidability of the ball and also make the mounting operation of the supporting members quick and easy without the need of any expensive facilities.

It is a third object of the present invention to provide a coordinate input device which can prevent the deformation of the rotating shafts rotating in association with the ball and effect stable detection of the rotation, and can be made compact.

According to a first embodiment of the present invention to achieve the first object, there is provided in a coordinate input device including a housing having an opening, a ball received in the housing so as to be rotatable in any direction, the ball partially projecting through the opening, a pair of rotating shafts arranged so as to define a predetermined angle therebetween in the housing and adapted to be rotated in association with rotation of the ball, a spring for biasing the rotating shafts against the ball, a rotation detector for detecting a quantity of rotation of each of the rotating shafts, and a printed board mounted on the housing, the rotation detector being mounted on the printed board, whereby a cursor position or the like on a screen is controlled according to the rotation of the ball in any direction; the improvement comprising at least three supporting members for supporting the ball, at least three retaining portions provided in the housing for respectively receiving the supporting members from a side of the housing where the printed board is to be mounted and for respectively retaining the supporting members in contact with the ball, a shaft supporting portion provided in the housing for supporting each of the rotating shafts mounted into the housing from the printed board mounting side of the housing in such a manner that the rotating shafts are displaceable toward and away from the ball, and a spring retainer portion provided in the housing for retaining the spring mounted into the housing from the printed board mounting side of the housing.

According to the first embodiment of the present invention, each of the rotating shafts is provided with a rotating plate opposed to a detecting portion of the rotation detector, and the rotation detector is provided with a nipping portion for nipping each of the rotating shafts in the vicinity of the rotating plate, each of the rotating shafts being rockingly displaceable toward and away from the ball about the nipping portion as a pivotal fulcrum.

According to a second embodiment of the present invention, to achieve the second object, there is provided in a coordinate input device including a housing having an opening, a ball received in the housing so as to be rotatable in any direction, the ball partially projecting through the opening, a pair of rotating shafts arranged so as to define a predetermined angle therebetween in the housing and adapted to be rotated in association with rotation of the ball, a spring for biasing the rotating shafts against the ball, a rotation detector for detecting a quantity of rotation of each of the rotating shafts, and a printed board mounted on the housing, the rotation detector being mounted on the printed board, whereby a cursor position or the like on a screen is controlled according to the rotation of the ball in any direction; the improvement comprising at least three supporting members for supporting the ball, and at least three cylindrical portions provided in the housing for respectively receiving the supporting members from a side of the housing where the printed board is to be mounted and for respectively retaining the supporting members in contact with the ball, each of the cylindrical portions having a slit extending in a longitudinal direction thereof, the printed board having at least three holes adapted to respectively engage the cylindrical portions, wherein the supporting members are respectively retained in the cylindrical portions by engagement of the cylindrical portions with the holes of the printed board.

According to the second embodiment of the present invention, each of the supporting member is spherical.

Also, according to the second embodiment of the present invention, an end portion of each of the cylindrical portions from which each of the supporting members is to be received is adapted to engage a positioning portion formed on a case of an electronic equipment into which the coordinate input device is to be installed.

According to a third embodiment of the present invention to achieve the third object, there is provided in a coordinate input device including a housing having an opening, a ball received in the housing so as to be rotatable in any direction, the ball partially projecting through the opening, a fixed supporting member provided in the housing for rotatably supporting the ball at three points, a pair of rotating shafts arranged so as to define a predetermined angle therebetween in the housing and adapted to be rotated in association with rotation of the ball, a pair of rotating plates respectively mounted on the rotating shafts in the vicinity of first ends thereof, and a rotation detector for detecting a quantity of rotation of each of the rotating plates, whereby a coordinate data is created according to the quantity of rotation of the rotating plates detected by the rotation detector; the improvement comprising a first wall portion provided in the housing for contacting the first end of each of the rotating shafts, a second wall portion provided in the housing for contacting a second end of each of the rotating shafts, a nipping member provided in the housing for nipping each of the rotating shafts in the vicinity of the first end thereof in such a manner that the rotating shafts are rotatable and rockingly displaceable toward and away from the ball, and a spring for biasing each of the rotating shafts in the vicinity of the second end thereof against the ball.

According to the third embodiment of the present invention, the nipping member is integrally formed with the rotation detector.

Also, according to the third embodiment of the present invention, the second wall portion contacting the second end of each of the rotating shafts is formed with a stopper portion for stopping the spring.

Also, according to the third embodiment of the present invention, the first and second ends of each of the rotating shafts are configured in a convex shape.

In the coordinate input device in accordance with the first embodiment, all of the ball supporting members, the rotating shafts, and the spring can be mounted into the housing from the printed board mounting side of the housing. Therefore, after the rotation detector is mounted on the printed board, all of the ball supporting members, the rotating shafts, the spring, and the printed board can be mounted to the housing in this order from the same side with the housing maintained in a fixed condition. Accordingly, the assembly operation of the coordinate input device can be improved.

Also, in the coordinate input device in accordance with the first embodiment, while the rotating shafts are normally biased against the ball by the spring, each of the rotating shafts is nipped by the nipping portion of the rotation detector in the vicinity of the rotating plate opposed to the detecting portion of the rotation detector in such a manner as to be rockingly displaceable toward and away from the ball about the nipping portion as the pivotal fulcrum. Therefore, even when each rotating shaft is displaced toward or away from the ball, slippage in position of the rotating plate relative to the detecting portion of the rotation detector can be suppressed. Accordingly, each rotating shaft can be maintained in reliable contact with the ball by the biasing force of the spring, and a reduction in detection accuracy of the rotation detector can also be prevented.

In the coordinate input device in accordance with the second embodiment, the ball is supported by the supporting members respectively inserted in the at least three cylindrical portions so as to be rotatable in any direction. When each supporting member is inserted into the corresponding cylindrical portion, and thereafter the cylindrical portion is engaged into the corresponding hole of the printed board, the cylindrical portion is reduced in diameter to clamp the supporting member therein, thereby retaining the same in contact with the ball. Accordingly, a retaining work of the supporting members into the housing can be easily carried out without using an adhesive or the like. Further, a step of inserting the supporting members into the respective cylindrical portions and a step of mounting the printed board on the housing can be carried out sequentially from the same side with respect to the housing. Accordingly, the assembly operation of the coordinate input device can be improved.

Also, in the coordinate input device in accordance with the second embodiment, it is unnecessary to consider the directionality of each supporting member upon mounting the same into the corresponding cylindrical portion. Accordingly, the assembly operation can be further improved.

Also, in the coordinate input device in accordance with the second embodiment, positioning of the coordinate input device with respect to the case of the electronic equipment can be carried out by utilizing the cylindrical portions for retaining the supporting members. Accordingly, it is unnecessary to provide any specific positioning means in the housing of the coordinate input device, thereby simplifying the structure of the housing.

In the coordinate input device in accordance with the third embodiment, a depression force applied to the ball is received by the fixed supporting member. Therefore, even when an excessive depression force is applied to the ball, there is no possibility that the depression force is applied to the rotating shafts to deform the same. Accordingly, a diameter of each rotating shaft can be reduced to thereby achieve a compact construction of the coordinate input device as a whole. Further, each rotating shaft is nipped by the nipping member in the vicinity of the first end of the rotating shaft in such a manner as to be rotatable and rockingly displaceable toward and away from the ball, and is biased against the ball by the spring in the vicinity of the second end of the rotating shaft. Therefore, the rotating shafts can be rotated always in association with rotation of the ball. Furthermore, the first and second ends of each rotating shaft are maintained in slide contact with the first and second wall portions, respectively, to restrict axial movement of the rotating shaft, and each rotating shaft is nipped by the nipping member in the vicinity of the first end of the rotating shaft where the rotating plate is mounted. Therefore, slippage in position of the rotating plate relative to the rotation detector for detecting a quantity of rotation of the rotating plate can be suppressed. Accordingly, a reduction in reliability of detection of rotation of the rotating plate by the rotation detector can be prevented.

Also, in the coordinate input device in accordance with the third embodiment, since the nipping member is integrally formed with the rotation detector, the position of the rotating plate mounted on each rotating shaft in the vicinity of the first end thereof relative to the corresponding rotation detector can be easily set. Further, an internal structure of the housing itself can be simplified to thereby achieve easy manufacturing of the housing.

Also, in the coordinate input device in accordance with the third embodiment, since the second wall portion contacting the second end of each rotating shaft is formed with the stopper portion for stopping the spring biasing the rotating shaft against the ball, the spring is hard to disengage from the rotating shaft. Further, since the stopper portion is formed on the second wall portion contacting the second end of each rotating shaft, an internal structure of the housing can be simplified to thereby achieve a compact construction of the housing and easy manufacturing thereof.

Also, in the coordinate input device in accordance with the third embodiment, since the first and second ends of each rotating shaft are configured in a convex shape, wear of the first and second wall portions due to sliding contact of the first and second ends of each rotating shaft therewith upon rocking of each rotating shaft can be minimized. Accordingly, the rotating shafts can be stably rotated without rattling.

Other objects and features of the invention will be more fully understood from the following detailed description and appended claims when taken with the accompanying drawings.

DETAILED DESCRIPTION OF THE PREFERRED EMBODIMENT

There will now be described a preferred embodiment of the present invention with reference to FIGS. 1 to 11.

Figure 1:
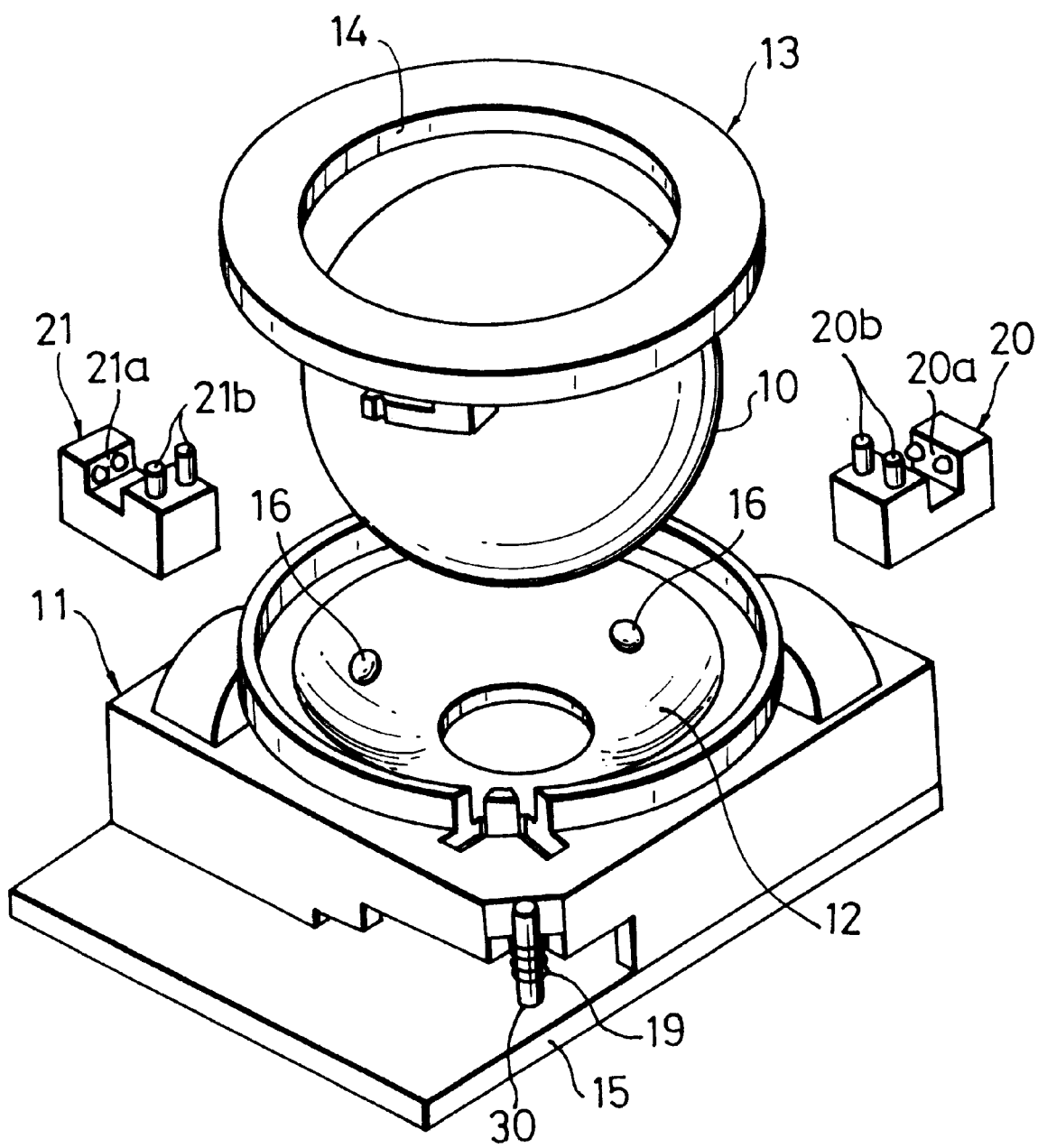
FIG. 1 is a partially exploded perspective view of a coordinate input device according to a preferred embodiment of the present invention.
Figure 2:
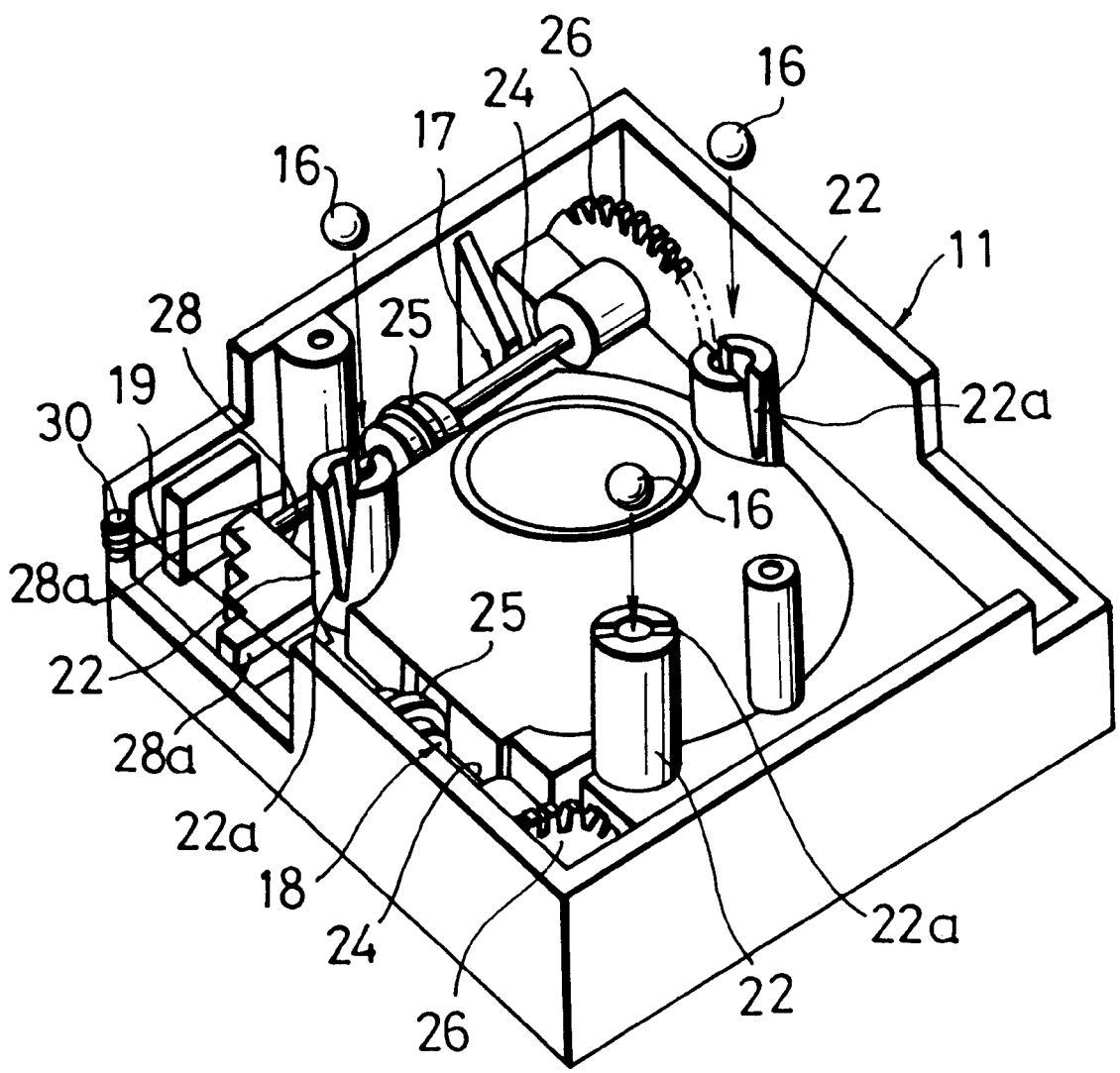
FIG. 2 is a perspective view of a housing of the coordinate input device shown in FIG. 1 as viewed from a printed board mounting side of the housing.
Figure 3:
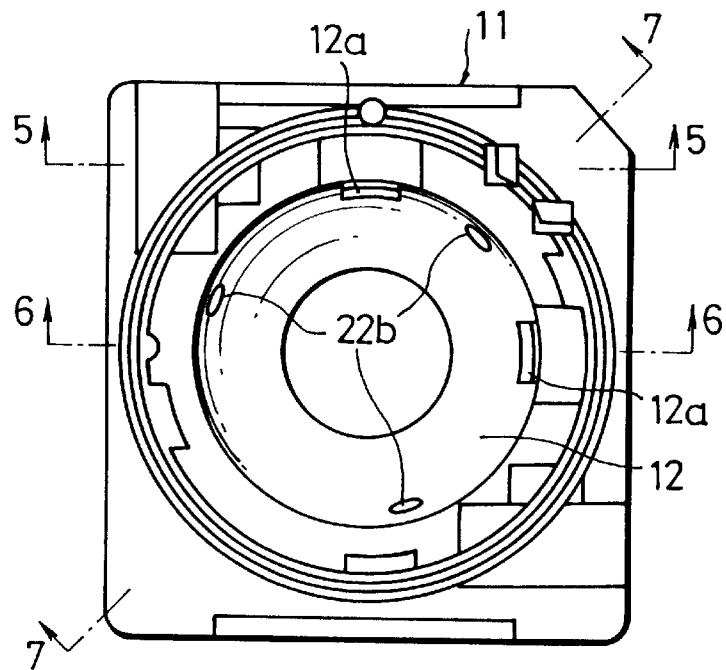
FIG. 3 is a top plan view of the housing shown in FIG. 1.
Figure 4:
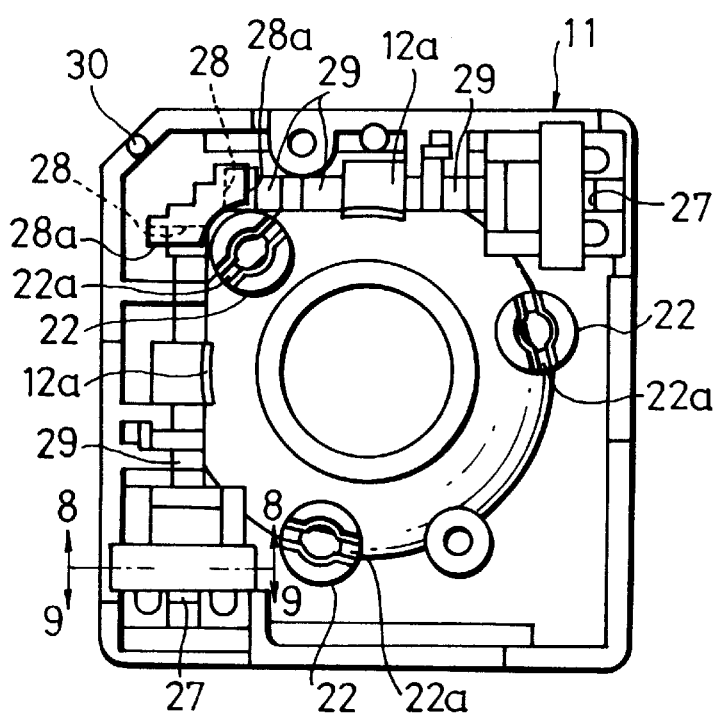
FIG. 4 is a bottom plan view of the housing shown in FIG. 1.

Referring to FIGS. 1 and 2, there is shown a coordinate input device provided with a ball 10, a housing 11 having an opening, and a ring-like retainer 13 adapted to be detachably mounted to the opening of the housing 11. The ball 10 is made of preferably resin superior in wear resistance, such as ABS, and it is more preferable to provide a spherical core made of a material having a large specific gravity, such as iron, in the resin layer, so as to make the ball 10 heavy to improve the operability. The housing 11 and the retainer 13 may be formed respectively by integral molding of resin such as ABS. On the opening side of the housing 11 is formed a ball receiving portion 12 for receiving the ball 10. A part of the ball 10 received in the ball receiving portion 12 of the housing 11 projects through an inside hole 14 of the retainer 13 mounted on the housing 11. A printed board 15 is mounted on the housing 11 on the opposite side of the opening of the housing 11.

Figure 5:
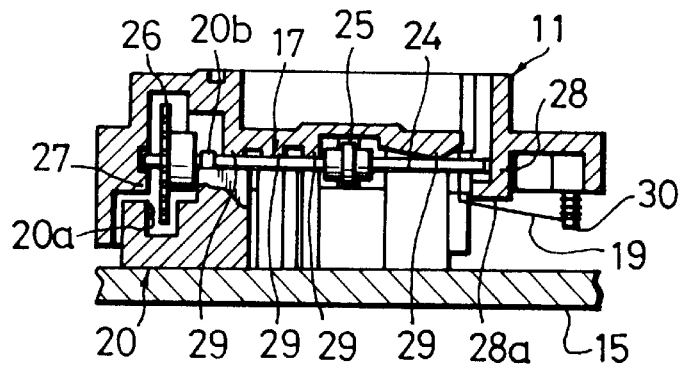
FIG. 5 is a cross section taken along the line 5—5 in FIG. 3.
Figure 6:
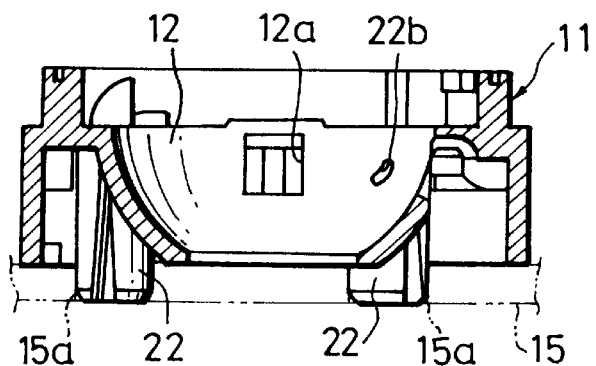
FIG. 6 is a cross section taken along the line 6—6 in FIG. 3.

Three supporting members 16 are located in the ball receiving portion 12 of the housing 11 to support the ball 10 at three points so that the ball 10 may be rotated in any direction. Each supporting member 16 is formed preferably as a spherical ruby ball. A pair of rotating shafts 17 and 18 are arranged in the housing 11 so as to be oriented orthogonally to each other and be normally biased against the ball 10 by a spring 19. Accordingly, the rotating shafts 17 and 18 can be rotated about the respective axes thereof orthogonal to each other in association with rotation of the ball 10 in any direction. Two rotation detectors 20 and 21 shown in FIGS. 1 and 5 are mounted on the printed board 15 to respectively detect the quantities of rotation of the rotating shafts 17 and 18 and generate pulse signals. Accordingly, by counting the pulse signals, a position indicating data for controlling a cursor position or the like on a screen of a display not shown.

Figure 10:
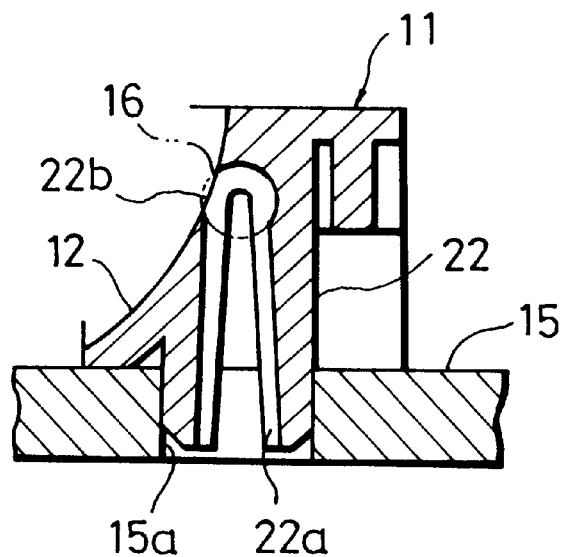
FIG. 10 is an enlarged sectional view of a cylindrical portion of the housing shown in FIG. 1.
Figure 12:
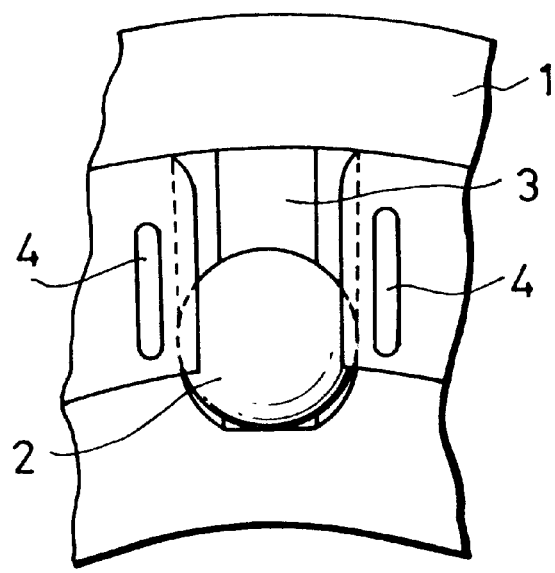
FIG. 12 is a plan view of an essential part of a mounting structure of a ball supporting member in a conventional coordinate input device.

A mounting structure of the supporting members 16 will now be described. As understood from FIGS. 2, 4, 7 and 10, the housing 10 is formed with three cylindrical portions 22 for respectively receiving the supporting members 16 from the printed board mounting side of the housing 11 and retaining the supporting members 16 in contact with the ball 10. Each cylindrical portion 22 is formed with a slit 22a extending in a longitudinal direction thereof. Accordingly, each cylindrical portion 22 can be flexed in radially inward and outward directions thereof. Each cylindrical portion 22 has a circular hole 22b opening to the ball receiving portion 12 of the housing 11. Each circular hole 22b has a diameter smaller than that of each spherical supporting member 16. Accordingly, a part of each supporting member 16 projects through the corresponding circular hole 22b of the cylindrical portion 22 to contact the ball 10. On the other hand, as shown in FIG. 10, the printed board 15 is formed with three circular holes 15a for respectively engaging the cylindrical portions 22 at their end portions from which the supporting members 16 are to be inserted respectively. Each circular hole 15a has an inner diameter slightly smaller than an outer diameter of each cylindrical portion 22. Accordingly, when each cylindrical portion 22 is in engagement with the corresponding circular hole 15a, it is flexed in the radially inward direction to reduce its outer diameter, thereby retaining the cylindrical portion 22 in contact with the ball 10. Accordingly, a retaining work for the supporting members 16 into the housing 11 can be easily carried out without using an adhesive or the like. Further, since the supporting members 16 are spherical in this preferred embodiment, it is unnecessary to consider the directionality of each supporting member 16 when inserting the supporting member 16 into the corresponding cylindrical portion 22.

Figure 7:
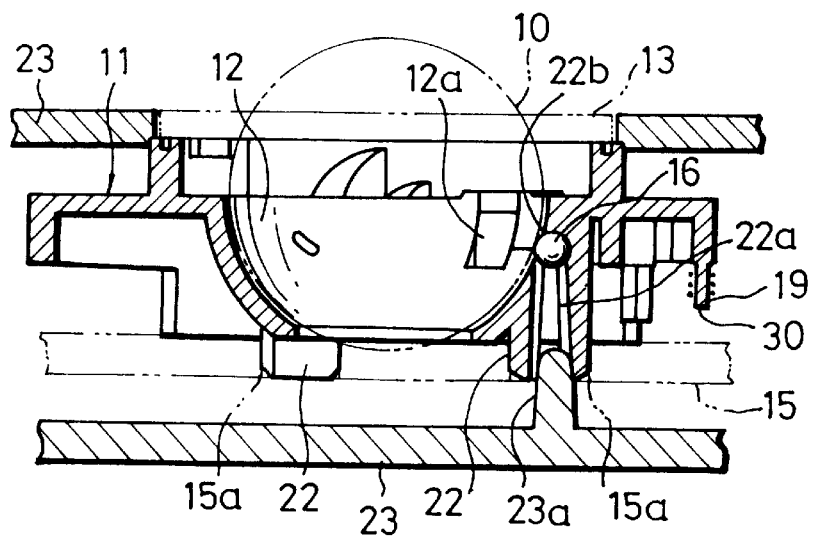
FIG. 7 is a cross section taken along the line 7—7 in FIG. 3 with the coordinate input device installed in a case of an electronic equipment.
Figure 8:
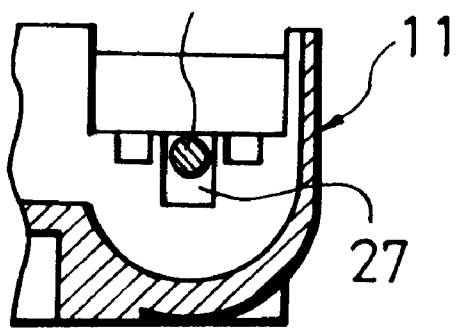
FIG. 8 is a cross section taken along the line 8—8 in FIG. 4.
Figure 9:
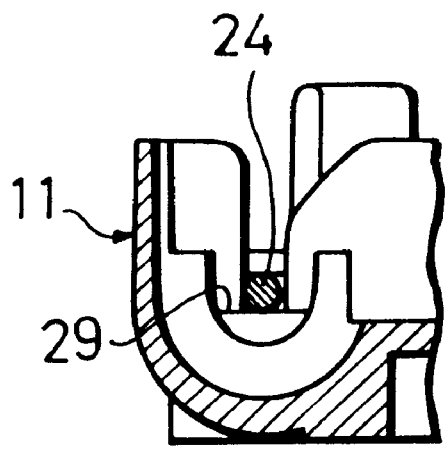
FIG. 9 is a cross section taken along the line 9—9 in FIG. 4.

FIG. 7 shows a condition that the coordinate input device is mounted in a case 23 of an electronic equipment such as a notebook-size personal computer. As shown in FIG. 7, the cylindrical portions 22 of the housing 11 are respectively engaged with the circular holes 15a of the printed board 15, and three positioning projections 23a of the case 23 are respectively engaged in the cylindrical portions 22. In this manner, the coordinate input device can be positioned by utilizing the cylindrical portions 22 for receiving the supporting members 16. Accordingly, it is unnecessary to provide any specific positioning means in the housing 11, thereby simplifying the structure of the housing 11.

Now, there will be described in detail the rotating shafts 17 and 18 and a mounting structure thereof. As shown in FIGS. 2 and 5, the rotating shaft 17 is provided with a shaft portion 24, a roller portion 25 mounted on the shaft portion 24 at a substantially central position thereof, and a rotating plate 26 mounted on the shaft portion 24 in the vicinity of one end thereof. The ball receiving portion 12 is formed with two openings 12a, and the roller portion 25 of the rotating shaft 17 partially projects through one of the two openings 12a to contact the ball 10. The other rotating shaft 18 has the same construction as that of the rotating shaft 17. Each rotating plate 26 of the rotating shafts 17 and 18 is formed as a light shielding disc having a plurality of slits throughout the outer circumference thereof, and as shown in FIG. 1, the rotation detectors 20 and 21 are respectively provided with detecting portions 20a and 21a of a photoelectric conversion type. Accordingly, when each rotating plate 26 is rotated, the slits and teeth formed throughout the outer circumference of the rotating plate 26 alternately cross an optical path of the detecting portion 20a or 21a, thereby generating the pulse signals corresponding to the quantity of rotation of each rotating plate 26.

The housing 11 is formed with two shaft supporting portions for respectively supporting the rotating shafts 17 and 18 in such a manner that the rotating shafts 17 and 18 can be displaced toward and away from the ball 10. The rotating shafts 17 and 18 are installed into the housing 11 from the printed board mounting side of the housing 11. Referring to FIGS. 4, 5, 8 and 9, the shaft supporting portion for supporting the rotating shaft 17 includes a first wall portion 27 adapted to contact one end of the shaft portion 24 on the rotating plate mounting side, a second wall portion 28 adapted to contact the other end of the shaft portion 24, and a third wall portion 29 having a plurality of supporting surfaces for supporting an intermediate portion of the shaft portion 24. The first wall portion 27 is formed with a recess opening to the printed board mounting side, so as to receive the one end of the shaft portion 24 from the printed board mounting side. The second wall portion 28 is formed with a horizontal projection 28a for preventing the other end of the shaft portion 24 from falling down to the printed board mounting side. The other shaft supporting portion for supporting the other rotating shaft 18 has the same construction as that of the above-mentioned shaft supporting portion for supporting the rotating shaft 17. Further, as shown in FIG. 11, the second wall portion 28 for the rotating shaft 17 is integrally formed with that for the rotating shaft 18.

Figure 11:
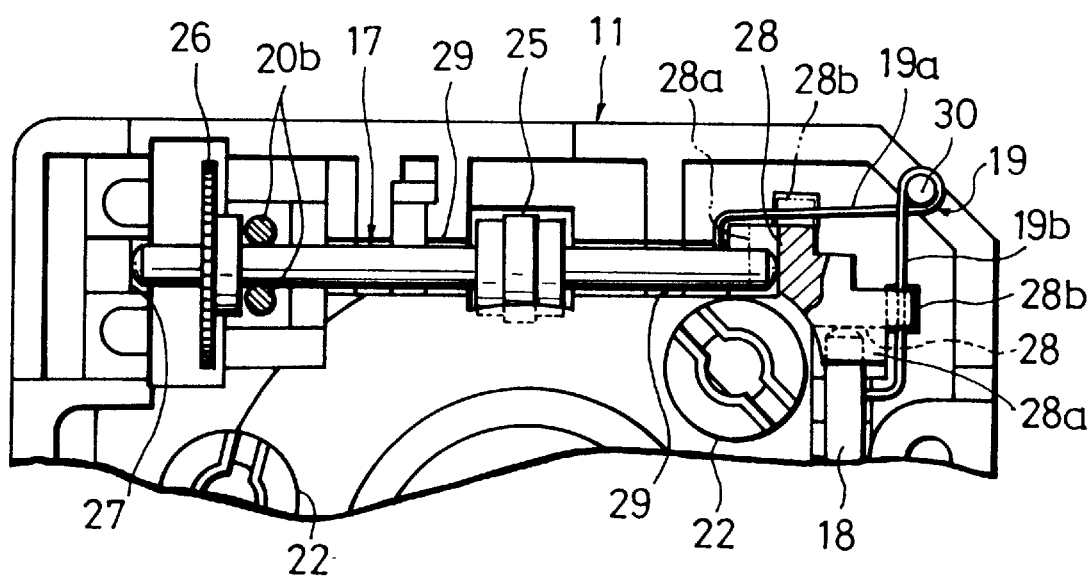
FIG. 11 is an enlarged bottom plan view, partially in section, of a rotating shaft supporting portion of the housing shown in FIG. 1.

As shown in FIGS. 1, 5 and 11, the rotation detectors 20 and 21 are respectively provided with nipping (pinching) portions 20b and 21b for respectively nipping the rotating shafts 17 and 18 in the vicinity of the rotating plates 26, that is, in the vicinity of the ends of the rotating shafts 17 and 18 on the rotating plate mounting side. Each of the nipping portions 20b and 21b is constructed of a pair of columnar projections arranged in parallel for nipping the rotating shaft 17 or 18 therebetween. That is, each columnar projection has a curved side surface adapted to contact an outer circumferential surface of the shaft portion 24 of each of the rotating shafts 17 and 18, so that when the rotation detectors 20 and 21 are mounted into the housing 11, the nipping portions 20b and 21b are respectively brought into engagement with the rotating shafts 17 and 18. With this construction, in the condition where the printed board 15 is mounted on the housing 11, the rotating shafts 17 and 18 can be displaced toward and away from the ball 10 in such a manner that they are respectively rockable about the nipping portions 20b and 21b as pivotal fulcrums. Further, as shown in FIG. 11, the opposite ends of each of the rotating shafts 17 and 18 are configured in a convex shape, so that wear of the first and second wall portions 27 and 28 due to sliding contact of the opposite ends with the wall portions 27 and 28 upon rocking of the rotating shafts 17 and 18 can be minimized. Accordingly, the rotating shafts 17 and 18 can be stably rotated without rattling.

Further, as shown in FIG. 11, the coil spring 19 is provided commonly for biasing the rotating shafts 17 and 18 against the ball 10. That is, the coil spring 19 is mounted on a spring retainer portion 30 of the housing 11 from the printed board mounting side of the housing 11. A pair of arms 19a and 19b extending from the opposite ends of the coil spring 19 are respectively engaged at their free end portions with the rotating shafts 17 and 18 in the vicinity of the other ends thereof on the second wall portions 28 side so as to bias the rotating shafts 17 and 18 against the ball 10. Further, the second wall portions 28 for the rotating shafts 17 and 18 are respectively integrally formed with stopper portions 28b, and the arms 19a and 19b of the coil spring 19 are respectively engaged at their intermediate portions with the stopper portions 28b of the second wall portions 28 for the rotating shafts 17 and 18.

In the coordinate input device having the above construction, all of the ball supporting members 16, the rotating shafts 17 and 18, and the spring 19 can be mounted into the housing 11 from the printed board mounting side of the housing 11. Accordingly, after the rotation detectors 20 and 21 are mounted on the printed board 15, all of the ball supporting members 16, the rotating shafts 17 and 18, the spring 19, and the printed board 15 can be mounted to the housing 11 in this order from the same side with the housing 11 maintained in a fixed condition. Accordingly, an assembly operation of the coordinate input device is improved.

Furthermore, in the coordinate input device having the above construction, while the rotating shafts 17 and 18 are normally biased against the surface of the ball 10 by the arms 19a and 19b of the spring 19, respectively, the rotating shafts 17 and 18 are respectively nipped by the nipping portions 20b and 21b of the rotation detectors 20 and 21 in the vicinity of the rotating plates 26 respectively opposed to the detecting portions 20a and 21a of the rotation detectors 20 and 21 in such a manner as to be rockingly displaceable toward and away from the ball 10 about the nipping portions 20b and 21b as the pivotal fulcrums, thus permitting oscillation of the axes of the rotating shafts 17 and 18. Accordingly, even when the rotating shafts 17 and 18 are displaced toward or away from the ball 10, possible slippage in position of the rotating plates 26 relative to the detecting portions 20a and 21a of the rotation detectors 20 and 21 can be suppressed. Accordingly, a reduction in detection accuracy of the rotation detectors 20 and 21 can be prevented.

Moreover, since the second wall portions 28 contacting the other ends of the rotating shafts 17 and 18 are formed with the stopper portions 28b for respectively stopping the arms 19a and 19b of the spring 19, the arms 19a and 19b are prevented from disengaging from the rotating shafts 17 and 18, respectively. Further, since the stopper portions 28b are integrally formed with the second wall portions 28, the internal structure of the housing 11 can be simplified to enable compactness of the housing 11 and also enable easy manufacturing of the housing 11.

Having thus described a specific preferred embodiment, it is to be noted that the present invention is not limited to the above preferred embodiment but various modifications may be made. For instance, each ball supporting member is not limited to a spherical member 16 but it may be formed as a rod member having a semispherical end for supporting the ball 10. Further, although the ball supporting members 16 are fixed in the cylindrical portions 22 by engaging the cylindrical portions 22 into the circular holes 15a of the printed board 15 in the above preferred embodiment, the fixation of the ball supporting members in the cylindrical portions may be realized by any other means such as plugs to be press-fitted with the cylindrical portions.

As described above, according to a first embodiment of the present invention, after the rotation detector is mounted on the printed board, all of the ball supporting members, the rotating shafts, the spring, and the printed board can be mounted to the housing in this order from the same side. Accordingly, the assembly operation of the coordinate input device can be improved.

Also, according to the first embodiment of the present invention, the rotating shafts can be maintained in reliable contact with the ball by the biasing force of the spring, and a reduction in detection accuracy of the rotation detector can be prevented.

According to a second embodiment of the present invention, a retaining work of the supporting members into the housing can be easily carried out without using an adhesive or the like. Accordingly, the supporting members for supporting the ball can be reliably mounted in the housing without damaging the slidability of the ball, and a mounting work of the supporting members can be carried out quickly and easily without requiring any expensive facilities.

Also, according to the second embodiment of the present invention, it is unnecessary to consider the directionality of each supporting member upon mounting the same into the corresponding cylindrical portion. Accordingly, the mounting work of the supporting members can be further improved.

Also, according to the second embodiment of the present invention, it is unnecessary to provide any specific positioning means in the housing of the coordinate input device. Accordingly, the structure of the housing can be simplified, and the coordinate input device can be positioned in the case of the electronic equipment.

According to a third embodiment of the present invention, the ball is supported by the fixed supporting member, and the rotating shafts are biased against the ball by the spring. Therefore, the rotating shafts can be prevented from being deformed by a depression force applied to the ball. Accordingly, a diameter of each rotating shaft can be reduced to thereby achieve a compact construction of the coordinate input device as a whole. Further, the first and second ends of each rotating shaft are maintained in slide contact with the first and second wall portions, respectively, to restrict axial movement of the rotating shaft. Additionally, each rotating shaft is nipped by the nipping member in the vicinity of the first end of the rotating shaft where the rotating plate is mounted, and is biased against the ball by the spring in the vicinity of the second end of the rotating shaft. Therefore, the rotating shafts can be rotated always in association with rotation of the ball, and slippage in position of the rotating plate relative to the rotation detector for detecting a quantity of rotation of the rotating plate can be minimized to thereby effect stable detection of the rotation. Thus, the deformation of the rotating shafts rotating with the ball can be prevented, and stable detection of the rotation can be effected. In addition, a compact construction of the coordinate input device can be effected.

While the invention has been described with reference to a specific embodiment, the description is illustrative and is not to be construed as limiting the scope of the invention.

Various modifications and changes may occur to those skilled in the art without departing from the spirit and scope of the invention as defined by the appended claims.

What is claimed is:

1. A coordinate input device comprising:

a housing including a semi-spherical wall having a concave surface located on a first side and a convex surface located on a second side, said housing defining a plurality of holes formed through said semi-spherical wall;

a plurality of cylinders, each of said plurality of cylinders having a fixed end integrally connected to said convex surface and a free end located on said second side, each cylinder including a central passage extending from an opening formed in said free end to one of said plurality of holes;

a plurality of ball supporting members, each ball supporting member being received in one of said central passages of said plurality of cylinders such that a portion of said ball supporting member extends from one of said holes, and wherein an outer diameter of said each of said plurality of ball supporting members is larger than a diameter of said plurality of holes;

means for retaining said plurality of ball supporting members in said central passages such that the portion of each of said plurality of ball supporting members extends from an associated one of said plurality of holes; and a ball rotatably disposed on said first side against the extending portions of each of said plurality of ball supporting members.

2. A coordinate input device of claim 1 wherein said means for retaining comprises a plurality of plugs, each plug being fixedly inserted into one of said central passages and having an end contacting one of said plurality of ball supporting members such that the portion of each of said plurality of ball supporting members extends from an associated one of said plurality of holes.

3. A coordinate input device of claim 1 wherein each of said plurality of ball supporting members is spherical.

4. A coordinate input device of claim 1 wherein each ball supporting member is a rod member having a semi-spherical end extending through one of said plurality of holes.

5. A coordinate input device comprising:

a housing including a semi-spherical wall having a concave surface located on a first side and a convex surface located on a second side, said housing defining a plurality of holes;

a plurality of cylinders, each of said plurality of cylinders having a fixed end integrally connected to said convex surface and a free end located on said second side, each cylinder including a central passage extending from said free end and communicating with one of said plurality of holes;

a plurality of ball supporting members received in said central passages of said plurality of cylinders such that a portion of each of said plurality of ball supporting members extends from one of said plurality of holes, wherein an outer diameter of said each of said plurality of ball supporting members is larger than a diameter of said plurality of holes;

means for retaining said plurality of ball supporting members in said central passages;

a ball rotatably disposed on said first side against said ball supporting members; and a printed circuit board connected to said housing on said second side of said semi-spherical wall, wherein each of said plurality of cylinders includes a pair of longitudinal slits extending from said free end to a point adjacent said fixed end such that said diameter of said central passage is adjustable, and said means for retaining comprises a plurality of receiving holes formed on said printed circuit board, each of said plurality of receiving holes being sized to pinch said free end of one of said plurality of cylinders such that said diameters of said central passages are smaller than said outer diameters of said plurality of ball supporting members when said free ends are located in said receiving holes.

6. A coordinate input device comprising:

a housing including a semi-spherical wall having a concave surface located on a first side and a convex surface located on a second side, said housing defining first and second openings and a plurality of holes formed through the semi-spherical wall;

a ball rotatably disposed in said housing on said first side adjacent said concave surface;

a first shaft rotatably connected to said housing on said second side, said first shaft having a first roller portion extending through said first opening and contacting said ball;

a second shaft rotatably connected to said second side, said second shaft having a second roller portion extending through said second opening and contacting said ball;

a spring connected to said housing on said second side and having a first portion connected to said first shaft and a second portion connected to said second shaft, wherein said spring biases said first and second roller portions against said ball;

a plurality of cylinders, each of said plurality of cylinders having a fixed end integrally connected to said convex surface and a free end located on said second side, each cylinder including a central passage extending from an opening formed in said free end to one of said plurality of holes;

a plurality of spherical ball supporting members, each ball supporting member being received in one of said central passages such that a portion of said ball supporting member extends from one of said holes and contacts said ball, and wherein an outer diameter of said each of said plurality of ball supporting members is larger than a diameter of said plurality of holes; and means for retaining said plurality of ball supporting members in said central passages such that the portion of each of said plurality of ball supporting members extends from an associated one of said plurality of holes.

7. A coordinate input device comprising:

a housing including a semi-spherical wall having a concave surface located on a first side and a convex surface located on a second side, the housing including a plurality of elongated chambers, each elongated chamber having a first opening forming a passage between said elongated chamber and the second side, the semi-spherical wall defining a plurality of circular second openings, each circular second opening forming a second passage between the first side and an associated one of the elongated chambers, each circular opening having a first diameter;

a plurality of ball supporting members, each ball supporting member having a semi-spherical surface and being received in one of the elongated chambers such that a portion of the semi-spherical surface protrudes from the circular opening associated with said one of said elongated chambers, the semi-spherical surfaces of the plurality of ball supporting members having a common second diameter which is larger than the first diameter of said plurality of openings; and a ball rotatably disposed on said first side against the extending portions of each of said plurality of ball supporting members.

8. The coordinate input device according to claim 7 further comprising:

means for retaining said plurality of ball supporting members in said elongated chambers.

9. The coordinate input device according to claim 8, further comprising:

a plurality of cylinders, each of said plurality of cylinders having a fixed end integrally connected to said convex surface and a free end located on said second side, each cylinder defining one of said elongated chambers;

a printed circuit board connected to said housing on said second side of said semi-spherical wall;

wherein each of said plurality of cylinders includes a pair of longitudinal slits extending from said free end to a point adjacent said fixed end such that said diameter of said central passage is adjustable, and said means for retaining comprises a plurality of receiving holes formed on said printed circuit board, each of said plurality of receiving holes being sized to pinch said free end of one of said plurality of cylinders such that said diameters of said central passages are smaller than said second diameters of said plurality of ball supporting members.

10. The coordinate input device according to claim 9, wherein the ball supporting members are spherical.

11. A coordinate input device of claim 9 wherein each of said plurality of ball supporting members is a rod member having a semi-spherical end extending through one of said plurality of circular holes.

* * * * *